(12) United States Patent
Brown

(10) Patent No.: US 7,498,511 B1
(45) Date of Patent: Mar. 3, 2009

(54) PIPE HANGER

(75) Inventor: Larry D. Brown, San Diego, CA (US)

(73) Assignee: Securus, Inc., Vista, CA (US)

( * ) Notice: Subject to any disclaimer, the term of this patent is extended or adjusted under 35 U.S.C. 154(b) by 358 days.

(21) Appl. No.: 11/287,004

(22) Filed: Nov. 22, 2005

(51) Int. Cl.
*H02G 7/00* (2006.01)

(52) U.S. Cl. .............................. 174/40 R; 174/40 CC; 174/74 R; 174/77 R

(58) Field of Classification Search ............. 174/110 R, 174/36, 40
See application file for complete search history.

(56) References Cited

U.S. PATENT DOCUMENTS

| | | | |
|---|---|---|---|
| 3,878,274 A | 4/1975 | Murayama et al. | |
| 3,916,488 A | 11/1975 | Gazda et al. | |
| 4,037,810 A | 7/1977 | Pate | |
| 4,204,135 A | 5/1980 | Murayama | |
| 4,353,763 A | 10/1982 | Simons | |
| 4,401,845 A * | 8/1983 | Odhner et al. | 174/113 R |
| 4,458,385 A | 7/1984 | Espinoza | |
| 4,544,685 A | 10/1985 | Hoelzer | |
| 4,763,867 A | 8/1988 | Hungerford | |
| 4,770,939 A | 9/1988 | Sietsess et al. | |
| 4,781,433 A | 11/1988 | Arroyo et al. | |
| 4,899,964 A | 2/1990 | Sick | |
| 4,919,372 A | 4/1990 | Twist et al. | |
| 4,930,544 A | 6/1990 | Ziu | |
| 4,957,251 A | 9/1990 | Hubbard | |
| 4,963,609 A | 10/1990 | Anderson et al. | |
| 5,018,260 A | 5/1991 | Ziu | |
| 5,383,994 A * | 1/1995 | Shea | 156/175 |
| D368,422 S | 4/1996 | Jensen | |
| 5,583,190 A | 12/1996 | Brinati et al. | |
| 5,593,115 A * | 1/1997 | Lewis | 248/68.1 |
| D379,584 S | 6/1997 | Lindquist | |
| 5,833,179 A | 11/1998 | VandenBerg | |
| 5,871,193 A | 2/1999 | Jacobs et al. | |
| 5,876,000 A | 3/1999 | Ismert | |
| 5,964,434 A | 10/1999 | Lynch, Jr. | |
| 6,032,907 A | 3/2000 | Santa Cruz et al. | |
| 6,126,122 A * | 10/2000 | Ismert | 248/74.1 |
| 6,224,025 B1 | 5/2001 | Alvarez | |
| 6,250,847 B1 | 6/2001 | Bingham, Jr. | |
| 6,386,489 B1 | 5/2002 | Gretz | |
| 6,390,421 B1 * | 5/2002 | Rudd | 248/68.1 |
| 6,402,096 B1 * | 6/2002 | Ismert et al. | 248/68.1 |
| 6,516,498 B2 * | 2/2003 | LaCoy et al. | 24/16 R |
| 6,572,057 B1 * | 6/2003 | Roth | 248/58 |
| 6,579,170 B1 * | 6/2003 | Davis | 454/232 |
| 6,685,144 B1 * | 2/2004 | Wochnick | 248/73 |
| D490,690 S | 6/2004 | Brass et al. | |
| 6,959,520 B2 | 11/2005 | Hartman | |
| 2004/0112625 A1 * | 6/2004 | Sheikholeslami et al. | 174/68.1 |
| 2005/0006335 A1 | 1/2005 | Brown | |

(Continued)

*Primary Examiner*—William H Mayo, III
(74) *Attorney, Agent, or Firm*—Stetina Brunda Garred & Brucker; Lowell Anderson

(57) ABSTRACT

A support for pipes and conduits inside an air plenum. The support has a first end adapted to fasten to a support structure inside an air plenum of a building. The support has a second end adapted to fasten to at least one elongated member, and a connector connecting the first and second ends. At least a portion of the first and second ends and the connector are made of a plastic material with an ASTM E-84 rating of about 25/50 or better, and preferably made of PVDF.

30 Claims, 4 Drawing Sheets

U.S. PATENT DOCUMENTS

2005/0121094 A1* 6/2005 Quigley et al. .............. 138/125
2005/0182167 A1 8/2005 Goodson et al.
2006/0197338 A1 9/2006 Ziu et al.

* cited by examiner

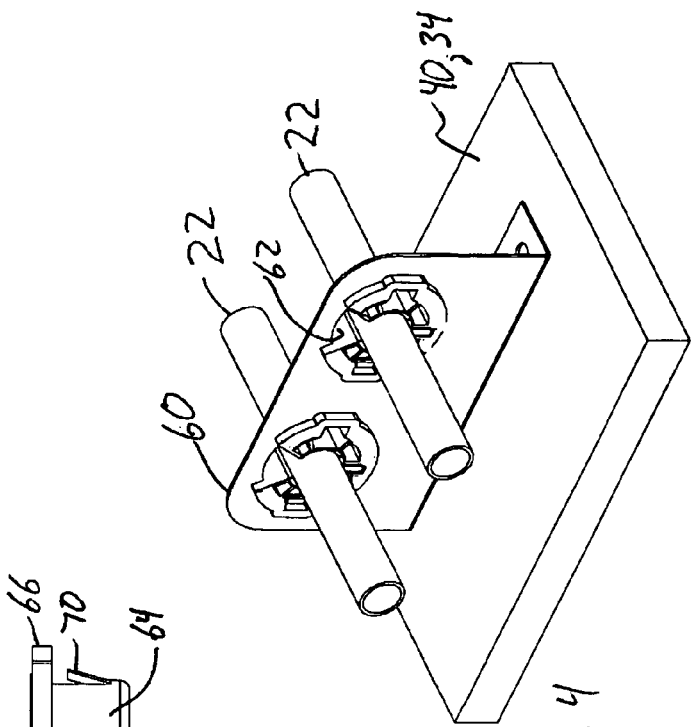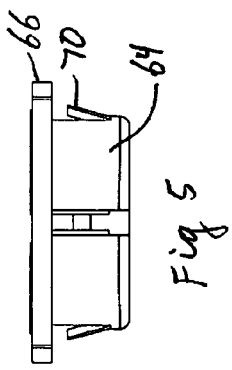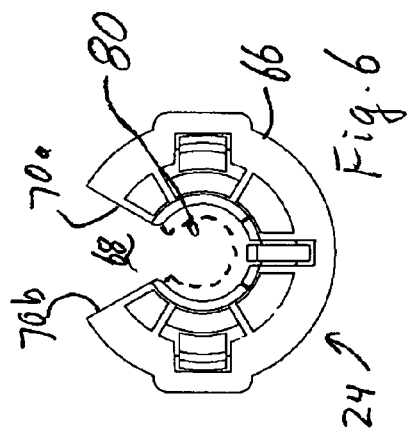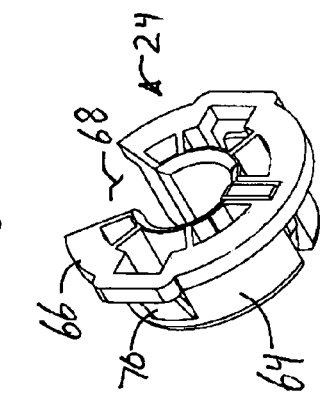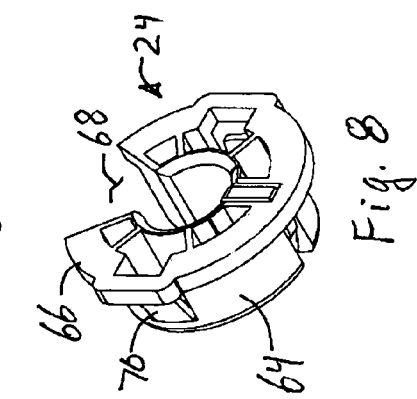

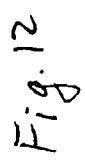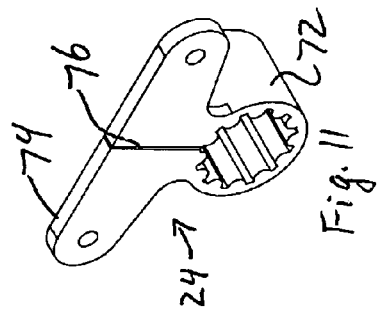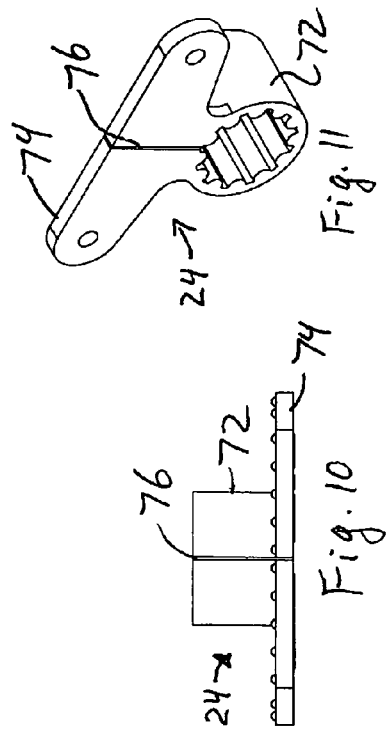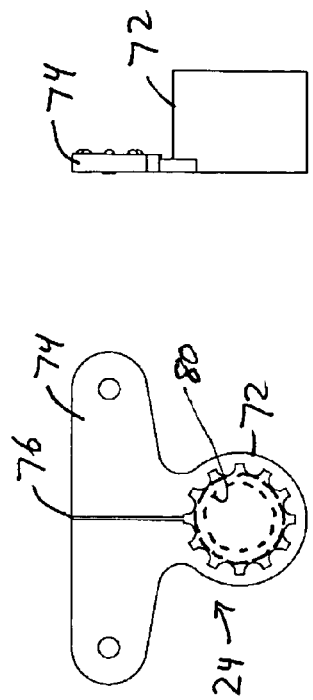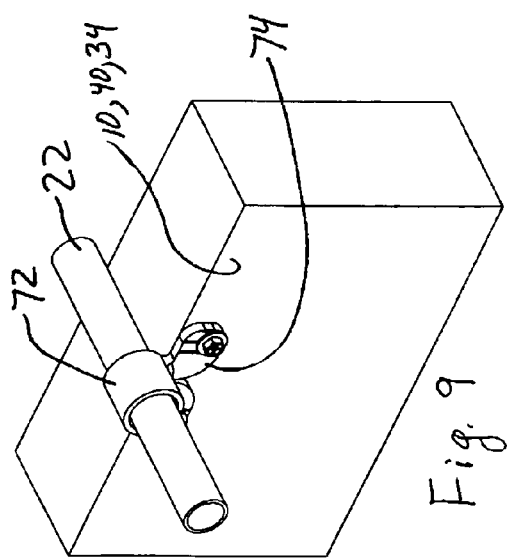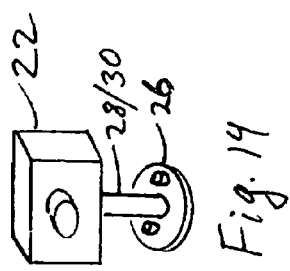

PIPE HANGER

BACKGROUND

This application relates to a hanger or support for pipes and other elongated members held inside air vents, plenums, ducts or other building conduits for circulating air.

Current construction techniques place ventilation passages and ducts throughout buildings. A number of pipes or conduits may be supported by pipe hangers within these passages or ducts. These pipe hangers have generally been made of metal, mineral products, etc., because in case of fire the pipe support cannot be permitted to burn and generate smoke and noxious fumes. But pipe supports made of such materials can be unnecessarily heavy and expensive, and their installation may be cumbersome and time consuming. Also, because the pipe hangers are of metal or other materials which may be difficult to process, the potential configurations are limited because it is expensive or technically challenging to form detailed shapes or to assemble complex parts. There is thus a need for an improved pipe hanger that can be used inside ventilation ducts and which is easy to manufacture and install.

The various building and mechanical codes in the U.S. (and many other countries) usually place restrictions on the smoke, fire and toxics performance of materials that may be used within building air passageways. In many buildings the spaces between the ceiling and roof, or above a suspended ceiling, or within walls, are often used as an air plenum and form part of the building ventilation system. Thus, said restrictions in the building and mechanical codes can affect not just the installation of ducting and vents, but in some cases can affect everything located, for example between a false ceiling and the roof or the structural ceiling. But the area between the false ceiling and the structural ceiling is also a prime area for the passage of building utilities such as piping and electrical wiring and conduit. Thus, supports for these items within such a building space may also have to conform to the smoke, fire and toxics requirements.

There is a standard, UL-1565, which may be applied to pipe and conduit hangers, etc., but it expressly does not apply to these parts when they are located within air plenums. Nonetheless, various standards and regulations have been applied to varying degrees to the fixtures used in these plenums and ducts. The primary standards often referenced by the various codes and engineers' building specifications for materials used within ducting or plenums are ASTM E-84 and UL-723, which apply to insulation, surface coverings, or other materials in sheet or continuous form. In said standards, the concerns are the generation of smoke and particulates, and the rate of propagation of a flame front. Because these specifications are for sheets of material, their scopes do not encompass small parts like pipe hangers and supports used in air plenums. Thus, the various plastic fittings available for supporting pipes and conduits are not qualified to meet the construction specifications as generally stated, and such use would likely violate the applicable building codes. Further, even if tested in sheet form, the plastic materials commonly used for plastic hangers and supports will not comply with the ASTM E-84 or UL723 standards. As a result, plastic materials are not generally used or permitted in such applications, and fixtures of metal, mineral wool, silicates, etc., are used instead in the plenums, ducts and other air passageways.

Further, the performance rating of a material based on its E-84 testing is typically stated in numerical terms as "xx/yy", where the value "xx" represents the flame spread rate and "yy" the smoke developed. These values are on a scale where fiber cement has a rating of "0/0" and red oak has a rating of "100/100". A rating of "0" does not necessarily mean that burning or smoke does not occur, but only reflects a rate or amount that is extremely low. The two ratings are independent, and it is possible to exceed 100 in either rating. Normal wall coverings in buildings are often held to a minimum E-84 rating of 25/450, which allows a high amount of smoke while restricting the allowable burn rate.

For use in air plenums, codes require materials to meet or better an ASTM E-84 rating of 25/50. The plastic materials used for making the pipe hangers and supports that are generally used in other parts of buildings are notorious for generating volumes of toxic smoke and fumes when burned, making the "smoke development" component of the requirements so difficult to meet that plastics support elements are not qualified for use in air plenums. The use of these smoke-generating plastic parts in air plenums is thus effectively barred by building codes. Thus, plastic parts that may be used underneath a house or in the walls of a building, are not qualified for use in air plenums, and are not used. Thus, supports made of polyethylene, polypropylene and nylon are not believed suitable for use in these locations with applicable building codes. Metal and other materials are used instead, with the above-mentioned problems.

Another standard is UL-2043, which normally applies to electrical devices, equipment, speakers, and some other kinds of discrete products that may have combustible components. UL-2043 is directed toward the caloric contribution of the material to the fire, and the amount of smoke generated when burned, but without any specific regard for the actual flammability of the material. This specification thus also does not describe pipe hangers and supports used in air plenums.

While the above-mentioned standards are not written to cover pipe supports and clamps used in air plenums and ducts, overall product compliance with one or more of these specifications is often required on projects. Metal pipe supports and clamps provide the ready solution since no plastic parts qualify for use in the air plenums. But metal parts are heavy, costly, difficult to fabricate and often difficult or time consuming to install or adjust. There is thus a need for improved supports and clamps for use in air plenums.

SUMMARY

A pipe hanger is provided that is made of polyvinylidine fluoride (PVDF). It is believed, based on published material testing results, that this material does not give off a sufficient amount of noxious fumes if burned, and does not burn at a sufficiently fast rate, to make it unsuitable for use in plenums and ducting. Moreover, this material allows pipe hangers of various configurations to be injection molded. While much more costly than other plastic materials used in other applications, it can still be cost-competitive with metal. Further, the ability to injection mold the hangers of this plastic material allow pipe hangers with more complex shapes to be formed and used.

There is thus provided a support for one or more elongated members inside an air plenum defined by a structure. The support includes a first end adapted to fasten to the structure and a second end adapted to fasten to at least one elongated member. At least a portion of the first and second end are made of a plastic material with a rating of about 25/50 or better according to the process and criteria of ASTM E-84, and are also optionally, but preferably, made of a material that can be injection molded to form the support.

In further optional variations, substantially all of the support is made of PVDF. Preferably, but optionally, the first end comprises a threaded portion and the support is made of PVDF. Optionally, the second end also comprises a threaded portion and the support is made of PVDF. The first and second ends can take various configurations, including a flexible strap. The support can comprise a tubular base configured to encircle at least a portion of the elongated member. An intervening portion optionally connects the first and second ends, with the intervening portion also optionally, but preferably, made of PVDF. In still further optional variations, the support may be made entirely or partially of PVDF, preferably injection molded, and may be additionally fitted with softer caps, inserts or coverings made of resilient materials which are capable of meeting the required smoke and flame specifications while also being capable of attenuating or absorbing conducted or radiated noise and vibration. Such supports may be particularly useful where sound and vibration control measures are required in the building construction. Suitably resilient materials may include expanded, foamed or treated PVDF sheet which has been thermoformed, molded or otherwise formed into appropriate shapes for the application.

In still further variations, the ducting forms a portion of a ventilation system in a building, and the ducting is fastened to the first end. Alternatively, the ducting is in turn supported by a bracket, and the first end being fastened to the bracket. The elongated members can comprise a pipe or electrical conduit fastened to the second end. In a further embodiment a support is provided having a first end adapted to fasten to one of a ventilation duct or a support for a ventilation duct, and having a second end adapted to fasten to an elongated member. The support is molded of a plastic material having an ASTM E-84 rating of about 25/50 or better.

In further optional variations of this alternative embodiment, the first end comprises a threaded portion. The second end optionally comprising a threaded portion, but could include a tubular portion configured to encircle at least a portion of the elongated member. Alternatively a second end including a flexible strap is believed desirable. In the above variations, the material is preferably PVDF. A foamed or layered piece of PVDF can also be interposed between the support and the item or elongated member held by the support. The piece of PVDF (or other similar material) can absorb vibrations to reduce transmission of acoustic noise.

BRIEF DESCRIPTION OF THE DRAWINGS

These and other advantages and features of the invention will be better appreciated in view of the following drawings and descriptions in which like numbers refer to like parts throughout, and in which:

FIG. 4 is a perspective view of a further embodiment of a bracket holding a support that in turn is shown holding a plurality of elongated members;

FIG. 5 is a front side plan view of the support shown in FIG. 4;

FIG. 6 is a top plan side view of the support of FIG. 5;

FIG. 7 is a left side view of the support shown in FIG. 6;

FIG. 8 is a perspective view of the support shown in FIG. 4;

FIG. 9 is a perspective view of a further embodiment of a support holding an elongated member;

FIG. 10 is a bottom side view of the support shown in FIG. 9;

FIG. 11 is a perspective view of the support shown in FIG. 9;

FIG. 12 is a right plan view of the support shown in FIG. 13;

FIG. 13 is a front plan view of the support shown in FIG. 11; and

FIG. 14 is a perspective view of a further embodiment of a support for an elongated member.

DETAILED DESCRIPTION

Figure 1:
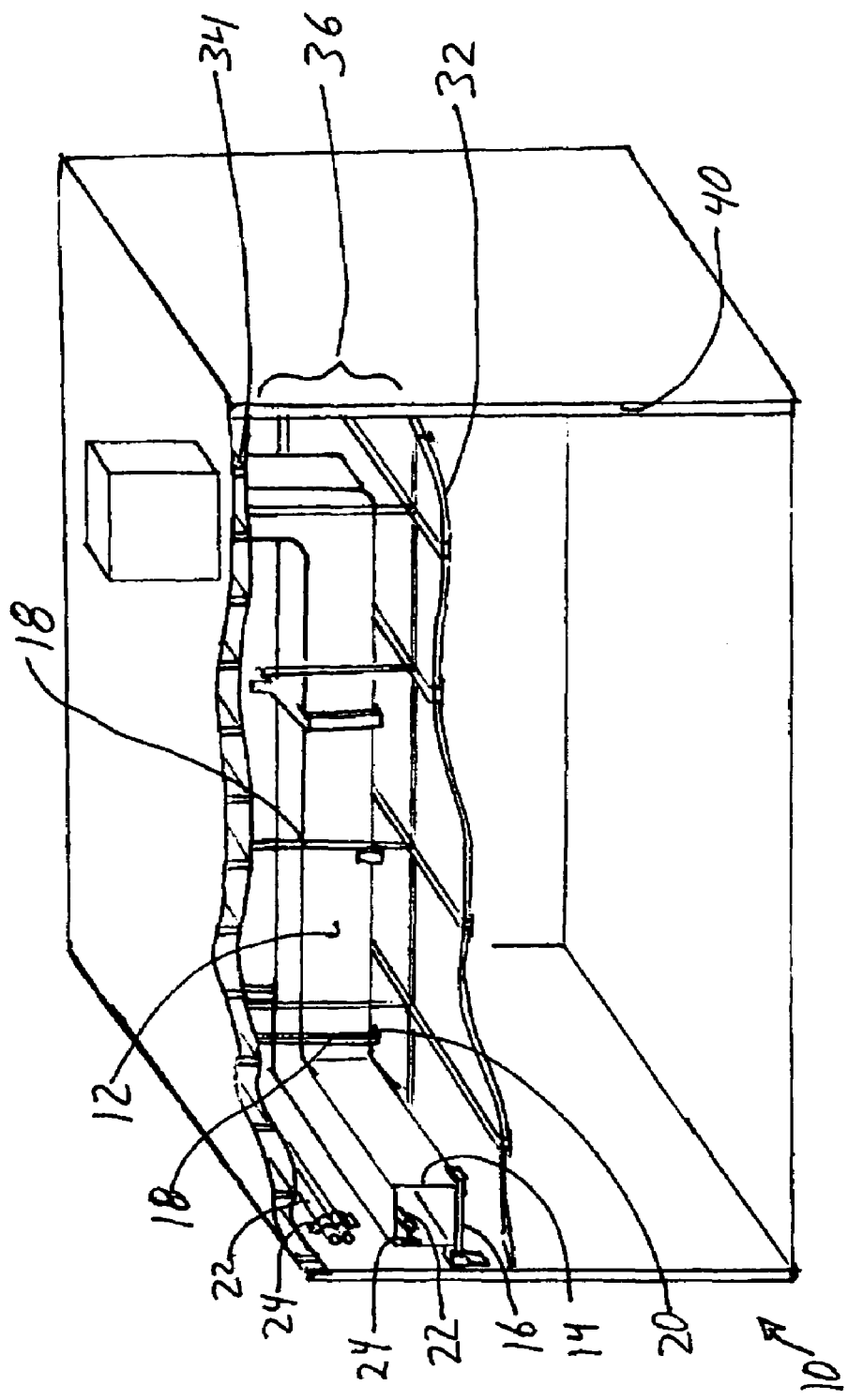
FIG. 1 is a perspective view of a building having an air plenum, ducting, and supports for elongated members.
Figure 2:
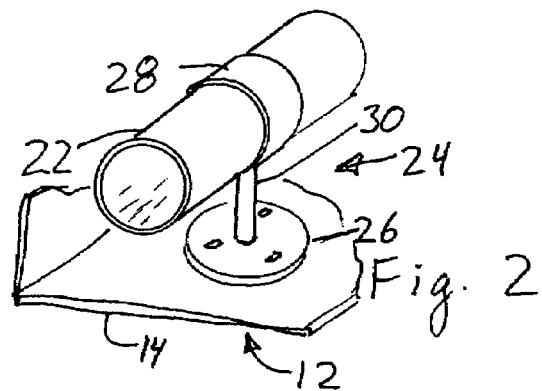
FIG. 2 is a perspective view of a further embodiment of a support holding an elongated member.

Referring to FIGS. 1-2, a portion of an illustrative building 10 is shown with an illustrative ducting 12. The ducting 12 is typically of metal and carries air throughout the building 10, or in some buildings also evacuates air and other fumes from portions of the building. The ducting 12 typically provides the ventilation system for the building and typically carries heated air in the winter, and cooled air in the summer. The ducting 12 is often of rectangular cross-sectional shape, made of rectangular metal tubing having walls 14 that are relatively thin compared to the overall dimensions of the ducting. The walls 14 are typically less than 0.1 inch thick (0.02 mm), and may have insulation sprayed on to the exterior of the walls, or wrapped around the exterior of the walls. The ducting 12 is typically held to the building by brackets 16 that have one end fastened to the building and have another end that supports a lower portion of the ducting or that encircle some or all of the ducting. Some ducting 12 is hung or suspended below brackets 16. Often the brackets 16 comprise threaded rods 18 extending from the ceiling of a building, with frames 20 extending between adjacent rods and either above or below the ducting (or both). Various fasteners, screws, etc. can secure the ducting to the brackets abutting the ducting.

Inside the ducting various elongated members 22 are often suspended, such as water pipes, electrical conduit, various wires, etc. Occasionally discrete items may also be supported in the ducting, such as a sensor. These elongated members and other discrete items are referred to herein collectively as elongated members 22. These elongated members 22 are held by one or more supports 24 which have a first end 26 adapted to fasten to the ducting 12 or to extend through a hole in the ducting and fasten to the bracket 16 supporting the ducting. The supports 24 have a second end 28 adapted to connect to one or more elongated member 22, with an optional intervening member 30 connecting the ends 26, 28. The supports are made of polyvinylidine fluoride (PVDF), and preferably integrally molded of PVDF, including any threaded portions. The PVDF is formulated to have sufficient mechanical properties to meet the structural requirements of the supports 24 described herein, when the portions of the support are appropriately designed and sized.

The ducting 12 is typically placed between a false ceiling 32 and a structural ceiling 34. In larger buildings the structural ceiling 34 is often of poured concrete or concrete slabs supported by steel frames. In smaller buildings the structural ceiling 34 is often formed of rafters or trusses made of wood or metal. The false ceiling 32 is typically suspended from the rods 18 fastened to the structural ceiling 34. Often the false ceiling 32 will be formed by a plurality of rectangular frames each holding a ceiling panel, with the frames being suspended by the rods 18 from the structural ceiling.

The space between the false ceiling 32 and the structural ceiling 34 comprises air plenum 36, and the air plenum 36 can optionally form a portion of the ventilation system of a building. The ducting 12 is typically located in the air plenum 36, but is sometimes located outside the air plenum. Elongated members 22 are fastened to the structural ceiling 34 or suspended therefrom, often by rods 18 to which are attached various supports 24. Often, stub-out bars or channels 38 (FIG. 3) are fastened between adjacent rafters or structural supports forming the structural ceiling 34 or walls 40, and the supports 24 are fastened to the stub out bars within the air plenum 36. Sometimes, various supports 24 are fastened to a single rafter or other portion of the structural ceiling 34 within the air plenum 36. Sometimes the elongated members 22 are fastened to the vertical walls 40 supporting the ceilings 32, 34. These walls typically have structural supports or studs made of wood or metal spaced periodically along the wall, and the supports 24 are often fastened to these structural supports in ways similar to those used to fasten to the structural ceiling 34.

Of course the ceiling of a lower level of a building is often the floor for a higher level, so the location of the air plenum 36 is relative, and is not critical. If the air plenum 36 is required by building codes to meet requirements governing the spread of flames and/or smoke, then the supports 24 within the air plenum, regardless of the specific location, are made of the material described herein.

The supports 24 can take various configurations. The first end 26 can take various configurations now known or developed in the future to fasten to the ducting 12 or to a bracket 16 supporting the ducting, or to a rod 18, or to a structural ceiling 34 or to frame 20 encircling a portion of the ducting or to wall 40. Common connections to the ducting 12 include adhesives fastening the first end 26 to the inside of the ducting 12 or to a structural ceiling 34 or walls 40. Preferably nails or threaded fasteners are used. Thus, threaded fasteners can engage mating threaded portion on the inside of the ducting or in the wall 14 of the ducting 12 or outside the wall 14 of the ducting, such as a nut. The ducting 12 could be made with internal brackets or fittings adapted to receive the first end 26 of the supports 24, such as a receptacle for a rotating bayonet lock formed on the first end 26, or a projection extending from the wall 14 with a lip on the projection to form a snap fit with a recess formed in the first end 26. Channel hangers can be placed inside the ducting 12, with the first end 26 fastening to fixed length or variable length channels or stub-out bars by means of fasteners or mechanical attachments such as ¼-turn latches.

More preferably though, the first end of support 24 passes through the wall of the ducting 12 to engage a bracket 16 or frame 20, since those parts are stronger than the thinner walls of the ducting. The bracket 16 or frame 20 can have a threaded recess to receive a threaded first end 26 of the support 24, or the bracket or frame can have a hole with the first end passing through the hole to be otherwise fastened on an exterior surface of the bracket. These illustrations of ways to fasten the support 24 to the ducting 12, bracket 16 or frame 20 are illustrative as various configurations that can be used, as long as the support 24 is made of PVDF or other non-combustible polymer as described herein.

The second end 28 is adapted to engage one or more elongated members 22, and the configuration of the second end can vary according to the configuration of the member 22. The second end 28 can comprise a threaded recess into which a fastener can extend to connect the elongated member(s) 22. Alternatively, the second end can comprise a flexible strap having prongs adapted to engage a recess in the support 24 after encircling a portion or all of the elongated member 22. In a further variation, the second end 28 can comprise two opposing portions each fastened to two parallel straps with a plurality of notches or ridges so the opposing portions can be urged toward each other by a pawl and ratchet mechanism engaging the notches or ridges, as generally illustrated in U.S. patent Ser. No. 10/734,953, the complete contents of which are incorporated herein by reference. In a further variation, the second end 28 could comprise an opening, preferably a circular opening, in a sheet of material or in a ring-type structure sized so that an elongated tube or cable could pass through the opening. In further variations, the support 24, or at least the second end 28, could have a configuration as shown in each of the following patents but made out of PVDF or other suitable material as described herein: D490,690, D379,584 (base with a semicircular recess and a semi-circular strap bolted thereto to encircle a pipe or elongated member 22); D368,422 (C-shaped holder with an elongated member 22 snap fit into the open portion of the C); U.S. Pat. No. 4,899,964 (one or more U shaped flanges with a mating member closing the open end of the U to encircle an elongated member 22); U.S. Pat. No. 5,876,000 (a ratchet member fastened to two opposing ratchet arms to urge holding an elongated member 22 to a base); U.S. Pat. No. 5,833,179 (elongated strap with semicircular recesses to hold various sized elongated members 22); U.S. Pat. No. 6,250,847 (pivoted strap encircles pipe or elongated member 22); U.S. Pat. No. 5,547,152 (L shaped bracket with one leg fastened to a duct or bracket and the other leg at an angle thereto and encircling an elongated member 22); U.S. Pat. No. 4,957,251 (semicircular flange with mounting tabs encircling a portion of an elongated member 22 with the tabs holding threaded fasteners fastened to a support); U.S. Pat. No. 4,763,867 (base with a spring element that is optionally corrugated to engage the elongated member 22); U.S. Pat. No. 4,037,810 (U shaped body portions holding elongated members 28). The complete contents of each of these above identified patents are incorporated herein by reference.

The intervening or connecting portion 30 can also be of various configurations, sizes and lengths. Typically the connecting portion 30 will be relatively short and is preferably of cylindrical cross section. But various configurations can be used.

The above patents and description also provide supports 24 that may be used to fasten to walls 40 or structural ceilings 34 or rods 18, either fastening directly or through the use of intermediate members such as stub-out bars or channels 38 or brackets.

These illustrations of ways to fasten the support 24 to the elongated member 22 are illustrative as various configurations which can be used, as long as the support 24 is made at least in part of PVDF, and is preferably made entirely of PVDF. Plastic materials other than PVDF could be used if they are made of a material that, if formed in a sheet, can meet or better the ASTM E-84 rating of 25/50, or reasonable approximations thereof. Preferably the material has an ASTM E-84 rating of 15/25 or less, when tested in sheet form, and ideally the rating approaches 0/0. But the specific rating can increase or decrease according to the applicable building codes.

In addition to having the desired E-84 rating, the material also is preferably, but optionally, suitable for injection molding. Injection molding requires a material with suitable viscosity to allow injection through molds and dies, and requires the plastic set fast enough to make molding practicable. If the material sets too slowly, then the mold gets hot, and production is too slow to be practical. Further, the material must have an appropriate shear so that the plastic forms stable chains when injected into the small portions of the dies or molds.

A plastic material not suitable for injection molding could be used for the brackets or stub-out bars 38, as long as the plastic is suitably pliable when hot or when formed so the plastic can be formed. But forming is labor intensive and that approach is thus not as desirable as injection moldable plastics.

The PVDF plastic has been tested in sheet form and certified to meet ASTM E-84 at a rating of 0/0. At the same time, the material meets or exceeds a UL94 rating of V-0, which is an indication of very good flame retardancy. In spite of the cost of the raw material, which is on the order of 4-5 times the cost of the materials normally used, these PVDF parts can prove competitive. Metal clamps typically require a different size for each kind or size of pipe, while plastics are more easily molded into parts that fit across a range of sizes. Thus, while these PVDF parts may be more expensive, sometimes much more so, the supports 22 made from them offer cost savings or other unique advantages in the right application. For example, where a large array of piping must be routed through a building, it may be more practical or cost-effective to pass through a plenum or duct space using clamps and hangers made of a more expensive material with a very good E-84 rating, rather than routing the piping through an alternative path.

Figure 3:
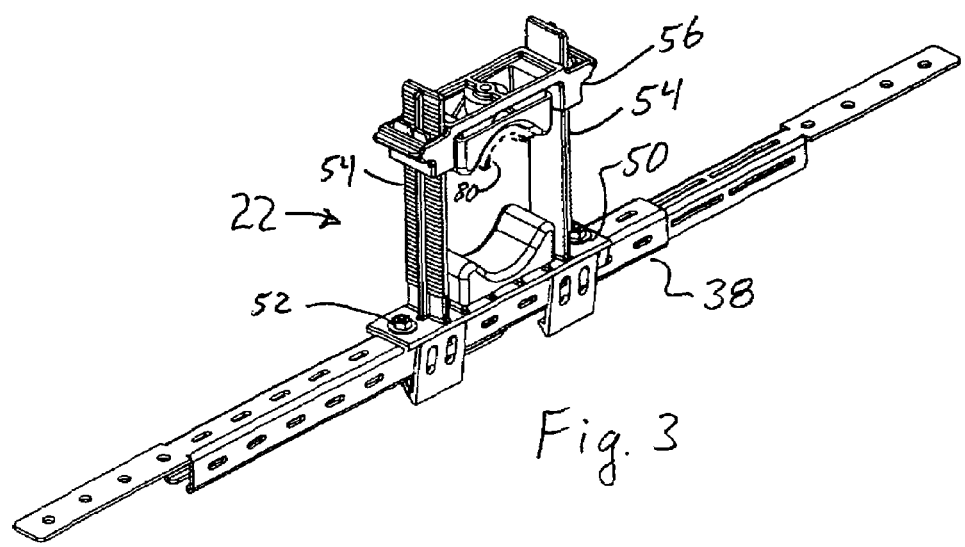
FIG. 3 is a perspective view of a further embodiment of a support for holding an elongated member.

Referring to FIG. 3, an illustrative embodiment of the support 22 is shown for use in fastening to building 10, preferably, but optionally, in an air plenum 34. A stub out bar or channel 38 is fastened between adjacent structural supports of the structural ceiling 34 or the wall 40. The illustrated support 22 comprises a base 50 held by fasteners 52 (such as screws or bolts) to the stub-out bar 38, and with spring clips to temporarily hold the support 22 to the bar 38. In other variations, a cammed surface is provided below the base 50 to form a twist lock fastener that is adapted to fit between the sides of the bar 38 and then be twisted into a releasably locking engagement with the bar or channel 38. Extending from the upper side of the base 50 are two parallel ratchet arms 54, with a retainer 56 having apertures to receive those arms so that an elongated conduit 22 is held between the base 50, arms 54 and retainer 56. Manually released pawls in the retainer apertures allow releasably locking the retainer to the arms. The support 22 is made of PVDF or other suitable plastic material as described herein.

In this embodiment the first end 26 comprises the fasteners 52 and spring clips, while the second end 28 comprises the base 50, arms 54 and retainer 56. The intervening member 30 comprises a poorly defined juncture between the two ends, or is non-existent. The support 22 can be fastened to other things than the stub-out bar or channel 38. The upper and lower directions used here are as with respect to the figures as shown in the drawings, as the actual orientation can vary during use.

Referring to FIGS. 4-8, an L-shaped bracket 60 has one leg is fastened to building 10, preferably by being screwed or nailed or glued to a wall 40, or a portion of the structural ceiling 34 or other portion of building 10. The other portion of the L-shaped bracket 60 has one or more openings 62 configured to receive support 24. This support 24 has a generally tubular base 64 with an outwardly extending flange 66. An opening or recess 68 is formed in the base 64 and flange 66, preferably formed from opposed inclined walls 70a, 70b having a radially inward spacing smaller than the size of conduit 22, and having a radially outward spacing larger than the size of the conduit 22, so the conduit can snap into the center of the tubular base 22 and flange 66, and not readily slide radially outward. Resilient latches extend outward from the base 64 toward the flange 66.

In use, the conduit 22 passes through the recess 68 and the base 64 is slid along the conduit and inserted through openings 62 in the bracket 60. The latches 70 and flange 66 are spaced apart so the support 60 is between them, providing a releasable latch connecting the support 24 to the bracket 60. In some applications the conduit 22 is passed through the openings 62 in the bracket 60, in other cases the opening 62 opens to an exterior surface of the bracket 60 so that the support 24 is first fastened to the conduit, and then the conduit and support 24 are inserted into an opening bracket 60. The support 22 of this embodiment is made of PVDF or other suitable plastic material as described herein. In this embodiment the first end 26 comprises flange 66 and/or latch(es) 70, while the second end 28 comprises base 64, with the intervening member 30 comprising the juncture between those ends.

Referring to FIGS. 9-13, the illustrated support 24 has a tubular base 72 encircling the elongated member 22, with a mounting flange 74 extending from one end of the base 72. The interior of the tubular base 72 can be ribbed as shown, or smooth, or of other configurations. A slot 74 extends from the inside of the tubular base, through the mounting flange 74, to an exterior surface. The mounting flange 74 is spread at the slot 76 so the elongated member 22 can be encircled by the base 72. The mounting flange 74 is fastened to the building 10, preferably by fastening to a wall 40 or part of the structural ceiling 34. In this embodiment, the support 22 is made of PVDF or other suitable plastic material as described herein, with the first end 26 comprising mounting flange 74, second end comprising base 72, and the support comprising an undefined or poorly defined portion joining those ends.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 14, a further embodiment of support 24 is shown comprising a first end 26 having holes for screws to pass through to fasten to a portion of building 10. The connecting member 30 extends from the first end 26 to second end 28 (not shown) which has threads that screw into a mating threaded recess in the elongated member 22. In this embodiment, the elongated member 22 comprises a sensor, such as an imaging device.

The support 24 can be made entirely of PVDF, or it can be partially of metal, with PVDF fastened to the metal by various ways, such as mating parts, over-molding, threaded fasteners, etc. Materials other than PVDF can be used instead of PVDF, or with PVDF, if the material, when made in sheet form, complies with the applicable building code requirements for flame, smoke and toxics, with those specific values being discussed elsewhere in this disclosure in terms of the ASTM E-84 rating, or in terms of compliance with UL-723. When this description refers to a support partially made of PVDF or other similarly performing material, it does not contemplate including enough material which fails to comply with the specified ASTM E-84 and UL 723 standards to cause the support 24 to fail to meet those standards. It does contemplate a support made of PVDF and metal or other materials meeting the ASTM E-84 and UL-723 standards.

The PVDF described above has sufficient mechanical strength and properties to be formed into the desired brackets, fittings, and other shapes needed to support the elongated members and other items. But PVDF can also be foamed or layered into sheets or pads 80 of material which have good insulating properties but lower mechanical properties. These foamed or layered pads or sheets 80 can be interposed between the supports 24 and the elongated members 22 or other items held by the supports 24, in order to absorb vibrations and reduce transmission of those vibrations through the support 24. The material dampens acoustic noise. These layered or foamed sheets or pads of material 80 are shown in broken lines in FIGS. 3, 6 and 13.

The above description is given by way of example, and not limitation. Given the above disclosure, one skilled in the art could devise variations that are within the scope and spirit of the invention, including various ways of configuring the support 24, especially regarding the prominence of the intervening portion 30. For all practical purposes, the intervening portion 30 can often be omitted. Further, while the entire support 24 is described as made of material PVDF, it is believed possible to make a portion of the support of a metal or other non-combustible material. If a portion of the support 24 extends outside the ducting 12, then that portion could be made of other material that is combustible or does not otherwise comply with the requirements for the materials to be used inside the ducting 12. But preferably the entire support 24 is made of PVDF or other similarly performing material. In view of these variations, the invention is not to be limited by the illustrated embodiments.

What is claimed is:

1. A plastic support for one or more elongated members inside an air plenum that is defined by a structure, the support comprising:
    a first end adapted to fasten to the structure defining the air plenum;
    a second end adapted to fasten to at least one elongated member, at least a portion of the first and second end being made of a plastic material with an ASTM E-84 rating of about 25/50 or better, and made of a material that is injection molded to form at least a portion of the plastic support.

2. The support of claim 1, wherein substantially all of the support is made of PVDF.

3. The support of claim 1, wherein the first end comprises a threaded portion and the support is made of PVDF.

4. The support of claim 1, wherein the second end comprises a threaded portion and the support is made of PVDF.

5. The support of claim 1, wherein the second end comprises a flexible strap.

6. The support of claim 1, further comprising an intervening portion connecting the first and second ends, the intervening portion made of PVDF.

7. The support of claim 1, further comprising ducting forming a portion of a ventilation system in a building, the ducting being fastened to the first end.

8. The support of claim 1, further comprising ducting, which ducting forms a portion of a ventilation system in a building, the ducting being supported by a bracket, the first end being fastened to the bracket.

9. The support of claim 1, further comprising a pipe or electrical conduit fastened to the second end, and wherein the support is made substantially of PVDF.

10. The support of claim 1, further comprising a portion of a building fastened to the first end, and wherein the support is made substantially of PVDF.

11. The support of claim 1, wherein the support has a tubular base configured to encircle at least a portion of the elongated member.

12. A support, comprising:
    a first end adapted to fasten to one of a ventilation duct or a support for a ventilation duct;
    a second end adapted to fasten to an elongated member located inside the duct, the support being molded of a plastic material having an ASTM E-84 rating of about 25/50.

13. The support of claim 12, wherein the first end comprises a threaded portion.

14. The support of claim 12, wherein the second end comprises a threaded portion.

15. The support of claim 12, wherein the second end includes a flexible strap.

16. The support of claim 12, wherein the support is made substantially of PVDF.

17. The support of claim 12, wherein second end comprises a tubular portion configured to encircle at least a portion of the elongated member.

18. The support of claim 12, further comprising a support fastened to the first end.

19. A support for one or more elongated members inside an air plenum defined by a structure, the support comprising:
    a first end fastened to a bar or channel which in turn is fastened to the structure defining the air plenum;
    a second end adapted to fasten to at least one elongated member, at least a portion of the first and second end being made of a plastic material with an ASTM E-84 rating of about 25/50 or better, and made of a material that can be injection molded to form the support.

20. The support of claim 19, wherein the first end comprises a threaded portion.

21. The support of claim 19, wherein the second end comprises a threaded portion.

22. The support of claim 19, wherein the second end includes a flexible strap.

23. The support of claim 19, wherein the material is PVDF.

24. The support of claim 19, wherein the support is made substantially of PVDF.

25. The support of claim 19, wherein second end comprises a tubular portion configured to encircle at least a portion of the elongated member.

26. The support of claim 19, further comprising a building fastened to the first end.

27. The support of claim 19, wherein the first end comprises a plate that fits between two lips and extends inside the bar or channel, with the plate configured to rotate ¼ turn inside the bar or channel.

28. The support of claim 1, further comprising a foamed or layered piece of PVDF located to be interposed between the support and the elongated member during use of the support.

29. The support of claim 12, further comprising a foamed or layered piece of PVDF located to be interposed between the support and the elongated member during use of the support.

30. The support of claim 19, further comprising a foamed or layered piece of PVDF located to be interposed between the support and the elongated member during use of the support.

* * * * *